United States Patent [19]
Yamazaki et al.

[11] Patent Number: 5,032,442
[45] Date of Patent: Jul. 16, 1991

[54] FIBRILLATED WEATHERPROOF WEBS HAVING NETWORK STRUCTURE, NONWOVEN FABRICS MADE FROM THE WEBS, AND PROCESSES FOR THE PRODUCTION OF THE WEBS AND NONWOVEN FABRICS

[75] Inventors: Shinji Yamazaki, Chiba; Toshio Kotsuka, Yokohama, both of Japan

[73] Assignee: Nippon Petrochemicals Company, Ltd., Tokyo, Japan

[21] Appl. No.: 422,657

[22] Filed: Oct. 17, 1989

[30] Foreign Application Priority Data

Nov. 9, 1988 [JP] Japan ............................ 63-281345

[51] Int. Cl.$^5$ .............................................. B32B 5/12
[52] U.S. Cl. ..................................... 428/105; 264/146; 264/147; 264/154; 264/DIG. 47; 428/109; 428/131; 428/134; 428/136; 428/137; 524/91; 524/205; 524/236; 524/291; 524/361; 524/785
[58] Field of Search ............... 264/DIG. 47, 146, 147, 264/154; 428/131, 137, 138, 134, 136, 105, 109; 524/91, 236, 291, 205, 361, 785

[56] References Cited

U.S. PATENT DOCUMENTS

| | | | |
|---|---|---|---|
| 3,169,899 | 2/1965 | Steuber | 428/198 |
| 3,669,795 | 6/1972 | Yazawa et al. | 156/265 |
| 3,734,812 | 5/1973 | Yazawa | 428/109 |
| 3,906,073 | 9/1975 | Kim et al. | 264/DIG. 47 |
| 4,129,632 | 12/1978 | Olson et al. | 264/DIG. 47 |
| 4,297,469 | 10/1981 | Hamakt | 264/DIG. 47 |
| 4,410,587 | 10/1983 | Fair et al. | 428/105 |
| 4,861,639 | 8/1989 | Vittone et al. | 428/105 |

*Primary Examiner*—James J. Bell
*Attorney, Agent, or Firm*—Oblon, Spivak, McClelland, Maier & Neustadt

[57] ABSTRACT

Disclosed herein is a fibrillated weatherproof web having a network structure, which can be produced with ease and is economical. The web comprises a multilayer composite film composed of at least two layers, one being a first layer (I) made of a first thermoplastic resin and the other a second layer (II) made of a second thermoplastic resin having a melting point lower than the first thermoplastic resin and containing at least 300 ppm of a light resistance imparting agent. A number of slits have been formed in a longitudinal or transverse direction. The web has been oriented at a draw ratio in a range of from 1.1 to 15 times. A nonwoven fabric making use of one or more fibrillated webs of the above sort and processes for the production of the web and nonwoven fabric are also disclosed.

17 Claims, 1 Drawing Sheet

FIBRILLATED WEATHERPROOF WEBS HAVING NETWORK STRUCTURE, NONWOVEN FABRICS MADE FROM THE WEBS, AND PROCESSES FOR THE PRODUCTION OF THE WEBS AND NONWOVEN FABRICS

BACKGROUND OF THE INVENTION

1. Field of the Invention:

This invention relates to fibrillated weatherproof webs which have a network structure and are resistant to light and the like. The webs are each composed of a composite film of at least two layers, one being a first layer (I) extruded from a first thermoplastic resin and the other a second layer (II) extruded from a second thermoplastic resin having a melting point lower than the first thermoplastic resin and containing an effective amount of a light resistance imparting agent. The invention is also concerned with nonwoven fabrics using the webs. The invention further pertains to processes for the production of the webs and nonwoven fabrics.

2. Description of the Related Art:

Nonwoven fabrics are currently produced by various processes, among which the spun-bonding process may be mentioned as a typical example. This spun-bonding process comprises introducing bundles of unstretched melt-spun filaments into an aspirator jet, drawing and jetting them by compressed air, stretching them and at the same time imparting static charges to them, opening them into monofilaments by static repulsion, and collecting the resultant monofilaments on a conveyor having opposite charges. Many techniques have heretofore been proposed with respect to this process [for example, Japanese Patent Publication No. 4993/1962, Japanese Patent Publication No. 26599/1968, Japanese Patent Publication No. 14913/1969, Japanese Patent Publication No. 21817/1969, Japanese Patent Publication No. 1941/1970, Offlegungschrift 17 60 730 (Japanese Patent Publication No. 1942/1970), U.K. Patent Specification 1,219,921 (Japanese Patent Publication No. 10779/1970), U.K. Patent Specification 1,214,509 (Japanese Patent Publication No. 33876/1970), and U.K. Patent Specification 1,271,844 (Japanese Patent Publication No. 3317/1971)].

Further, nonwoven fabrics composed of at least one layer made of a fibrous material and at least one warped stretched tape laminated together are also known (U.S. Pat. No. 3,734,812).

As a further production process, nonwoven fabrics are formed by forming tubular films of a molten resin, stretching and fibrillating the films into fibrillated films having a network structure, i.e., into split fibers, spreading the split fibers over a predetermined width and setting them, and then laminating them in a warp/weft relationship [U.S. Pat. No. 3,669,795 (Japanese Patent Publication No. 2786/1972, Japanese Patent Publication No. 4738/1972 and U.K. Patent Specification 1,386,438). These nonwoven fabrics are used as padding cloths for dress fabrics, filters, gauzes, linens, masks, mining and engineering materials such as battery separators, agricultural and horticultural materials, building and construction materials, etc.

It is well-known that these plastic-made non-woven fabrics are exposed to sunlight, rain, air oxygen, air ozone, mould and the like and are hence deteriorated when employed outdoors.

As a measure especially against ultraviolet rays, heat, oxygen including ozone, and the like, it is the general practice to incorporate a light resistance imparting agent such as an ultraviolet absorber or light stabilizer or a weatherproofing agent such as an antioxidant in resins or to coat resins with such a material.

The following exemplary methods may be mentioned for the practice of such a measure:

A weatherproofing agent is kneaded directly into a resin. As in Japanese Patent Publication No. 2344/1961, an organic polymer film is immersed in a solution of an ultraviolet absorber and after evaporating the solvent, the thus-immersed film is heated to have the ultraviolet absorber united to the surface layers of the film.

As in U.K. Patent Specification 1,124,433 (Japanese Patent Publication No. 24160/1971), an ultraviolet absorber is dissolved in a liquid polyhydric alcohol and the coated.

Japanese Patent Application Laid-Open No. 43972/1988 discloses the coating of a weatherproof paint.

Japanese Patent Application Laid-Open Nos. 201237/1987 and 234924/1987 disclose a laminate formed by providing transparent films on outer sides and as a middle layer an adhesive layer added with an ultraviolet absorber.

Japanese Patent Application Laid-Open No. 238741/1987 discloses a film formed by providing a coating of an acrylic resin on one side or both sides of a polyvinyl chloride resin film containing an ultraviolet absorber.

In Japanese Utility Model Publication No. 37729/1987, is discloses a film formed by providing an acrylic resin coating, in which an ultraviolet absorber is incorporated, on one side of a biaxially-stretched polyethylene terephthalate film.

A multilayer resin film composed of a biaxially-stretched film as a base layer and a surface layer composed of a uniaxially-stretched film, which contains a weatherproofing agent, and laminated on the base layer is proposed in Japanese Patent Publication No. 59668/1987.

However, the method in which a weatherproofing agent or the like is directed kneaded in a resin requires the uniform incorporation of the weatherproofing agent or the like in a large amount. This method is therefore accompanied by drawbacks such that the resulting product is costly and when the product is a film, its uniaxial stretching results in stretch irregularity and/or cutting.

On the other hand, the incorporation of a large amount of an additive or filler in a base material layer to be stretched impairs the quality of the base layer and in addition, the large amount of the additive undergoes blooming to form die deposit in a stretching step. These lead to the occurrence of cutting or slitting upon stretching. Further, the white powder and die deposit blocks splitter blades so that splitting is hampered.

When a film defining slits, such as a nonwoven fabric of split fibers, is stretched in particular, the above problems become remarkable so that the above method is not suitable for actual production of nonwoven fabrics of split fibers.

Further, the coating of a pre-stretched film with a solution of an ultraviolet absorber, the coating of at least one surface of a base material with an acrylic resin containing an ultraviolet absorber, the lamination of at least one stretched film with at least one stretched film containing an ultraviolet absorber, and the like all contain irksome steps.

It may be contemplated of applying these methods to nonwoven fabrics of split yarns. Stretching of the film, which has been coated in advance with the solution of the ultraviolet absorber or with the acrylic resin containing the ultraviolet absorber, after formation of slits therein however leads to a problem such that the resulting film may be peeled off.

On the other hand, in the method in which the solution of the ultraviolet absorber or the acrylic resin containing the ultraviolet absorber is coated subsequent to stretching of a slitted film, the solution of the ultraviolet absorber or the acrylic resin containing the ultraviolet absorber is wasted and moreover, the adhesion between the stretched base material and the coating film is poor. Moreover, the light imparting effect is suspicious.

Furthermore, the conventional methods are accompanied by various other problems such as environmental solvent contamination, safety problems and management of solvents.

SUMMARY OF THE INVENTION

An object of the invention is generally to provide a method for solving problems in processability, product quality and economy, which are frequently encountered in the conventional process in which a light resistance imparting agent or the like is kneaded in a resin, the resultant resin is formed into a web and the web is then stretched or a stretched web is coated with an ultraviolet absorber or the like. A first specific object of the invention is to provide a weatherproof web having a network structure.

A second specific object of the invention is to -provide a nonwoven weatherproof fabric of split yarns, which uses the above fibrillated web of the network structure.

A third specific object of the invention is to provide processes for the production of the fibrillated web and a nonwoven fabric made of such a fibrillated web.

In a first aspect of this invention, there is thus provided a fibrillated weatherproof web having a network structure and comprising a multilayer composite film formed of at least two layers, one being a first layer (I) extruded from a first thermoplastic resin and the other a second layer (II) extruded from a second thermoplastic resin having a melting point lower than the first thermoplastic resin and containing at least 300 ppm of a light resistance imparting agent, said film defining a number of slits (which are called "slits" in the invention) formed in a longitudinal or transverse direction thereof and having been oriented at an extension ratio in a range of from 1.1 to 15 times, and optionally, having been expanded in a perpendicular or oblique direction relative to the axis of orientation and then heat-set.

In a second aspect of this invention, there is also provided a nonwoven fibrillated weatherproof fabric having a network structure and comprising, as at least one of warp and weft members thereof, the above-mentioned fibrillated weatherproof web. Preferred embodiments of the nonwoven fibrillated weatherproof fabric include a nonwoven fibrillated weatherproof fabric having a network structure and composed of the fibrillated weatherproof web and a rolled or stretched tape laminated with said fibrillated weatherproof web in a warp/weft or weft/warp relationship with axes of orientation thereof crossing each other as well as a nonwoven fibrillated weatherproof nonwoven fabric having a network structure and composed of the fibrillated weatherproof web and at least one additional fibrillated weatherproof web having a network structure, said additional webbing being of the same type as the fibrillated weatherproof web, all the said fibrillated weatherproof webs being laminated with axes of orientation thereof crossing each other.

In a third aspect of this invention, there is also provided a process for the production of a fibrillated weatherproof web having a network structure, which comprises forming a multilayer composite film composed of at least two layers, one being a first layer (I) extruded from a first thermoplastic resin and the other a second layer (II) extruded from a second thermoplastic resin having a melting print lower than said first resin and containing an effective amount of light resistance imparting agent; and subjecting said multilayer composite film to first orientation at an extension ratio in a range of from 1.1 to 8 times in a machine direction by rolling and/or stretching same and then to second orientation at an extension ratio of from 5 to 15 times in the machine direction to form slits or to split said composite film; and optionally expanding the thus-obtained film in a direction perpendicular or oblique to the length thereof and then heat-setting the film thus expanded.

In a fourth aspect of this invention, there is also provided a process for the production of a fibrillated weatherproof web having a network structure, which comprises forming a multilayer composite film composed of at least two layers, one being a first layer (I) extruded from a first thermoplastic resin and the other a second layer (II) extruded from a second thermoplastic resin having a melting point lower than said first resin and containing an effective amount of light resistance imparting agent; rolling the composite film at a rolling ratio in a range of from 1.1 to 5 times in a transverse direction of the film; forming a number of slits in parallel in said transverse direction; and stretching the resultant film at a draw ratio in a range of from 2 to 10 times in said transverse direction; and optionally expanding the thus-obtained film in a direction perpendicular or oblique to the length thereof and then heat-setting the film thus expanded.

DESCRIPTION OF THE PREFERRED EMBODIMENTS OF THE INVENTION

Figure 1:
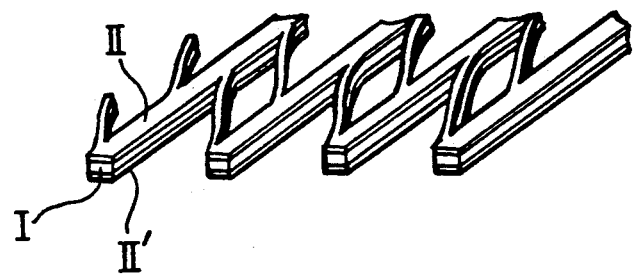
FIG. 1 is a perspective, pictorial view of a fibrillated web having an open network structure according to the present invention.
Figure 2:
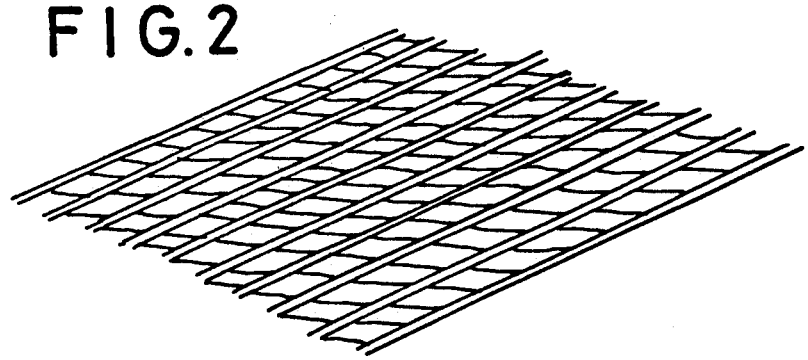
FIG. 2 is a perspective, pictorial view of a web constructed according to FIG. 1.
Figure 3:
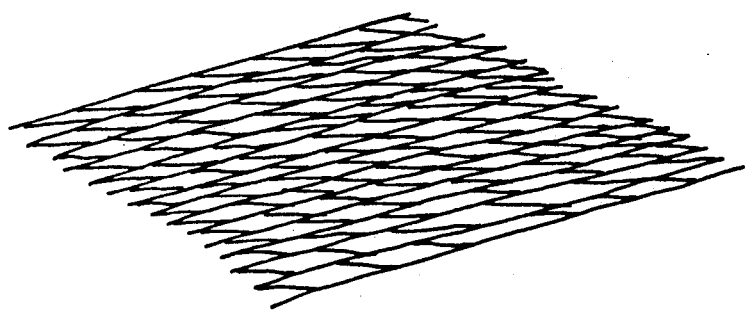
FIG. 3 is a view similar to FIG. 2 showing another type of fibrillated web produced according to the process of the present invention, with the fibers shown as having a smaller width as compared to that of the fibrillated web of FIG. 2.

Referring now to FIG. 1, shown at (I) is a polymer layer and at (II) a polymer layer having a lower melting point and containing a light resistance imparting agent. The fibrillated web as shown is of a laminated construction consisting of at least two layers of polymers (I) and (II). The outline of the fibrillated web is shown in its entire perspective view in FIG. 2.

Figure 4:
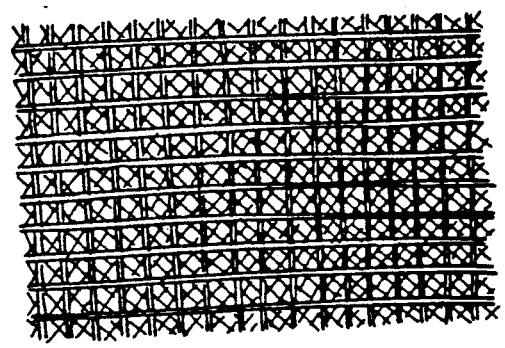
FIG. 4 is a plan view of the nonwoven fabric of the overlaid, two fibrillated webs having a network structure as shown above.

In FIG. 4, in addition to a web, there is shown another similar fibrillated web made from a laminated web consisting of a polymer layer (I') and a polymer layer (II'). Likewise, (I') designates a polymer and (II') does a polymer having a lower melting point.

The fibrillated web having a network structure according to the first aspect of this invention is composed of an at least two-layer composite film formed from a first thermoplastic resin, which forms the first thermoplastic layer (I), and a second thermoplastic resin having a melting point lower than the first thermoplastic resin and added in advance with at least a light resistance imparting agent by using an extrusion process such as the multilayer inflation process or multilayer T-die process.

The film is a fibrillated weatherproof web having a network structure. It has been stretched at an extension ratio of 1.1–15 times in a longitudinal or transverse direction and defines a number of slits. It has also been suitably expanded in a perpendicular or oblique direction relative to the axis of orientation thereof, followed by heat-setting.

Described more specifically, fibrillated webs according to this invention may be classified roughly into uniaxially-stretched fibrillated webs having a network structure and biaxially-stretched fibrillated webs having a network structure. The former webs are each composed of a warp web formed by stretching the multilayer film in the machine direction thereof or of a weft web obtained by stretching the multilayer film in the transverse direction thereof. The latter webs are each obtained by stretching the multilayer film in both the machine and transverse directions thereof. Uniaxially-stretched fibrillated webs are chosen more preferably from the standpoint of mechanical strength and the like.

In the fibrillated web of the network structure, the thermoplastic resin layer (II) of the lower melting point as a surface layer contains an additive such as at least a light resistance imparting agent and the thermoplastic resin layer (I) as a base layer, said layer (I) being preferably crystalline, does not contain such an additive at all. It is hence possible not only to realize the prevention of cutting upon stretching, any reduction to stretching effects and undesirable propagation of slits but also to retain sufficient light resistance.

Although no particular limitation is imposed on the thickness ratio of the thermoplastic resin layer (II) of the lower melting point to the thermoplastic resin layer (I) in the multilayer composite film, it is preferred to limit the thickness of the thermoplastic resin layer (II) of the lower melting point to 50% or less, more preferably 40% or less of the thermoplastic resin layer (I) when the thermoplastic resin layer (II) is used as an adhesive layer.

Each thermoplastic resin layer (II) of the lower melting point generally has a thickness of 5 μm or greater in an unstretched state. Although it has effective light resistance even when its thickness is around 5 μm, a thickness range of from 10 μm to 100 μm may preferably adopted to satisfy economy, light resistance and various physical properties such as bonding strength when fusion-bonded.

As the resins forming the thermoplastic resin layer (I) and thermoplastic resin layer (II) in this invention, no particular limitation is imposed thereon as long as they have different melting points. However, as the resin forming the thermoplastic resin layer (I), it is generally preferred to use a crystalline thermoplastic resin.

Specific examples include polyolefins, e.g., homopolymers of α-olefins such as ethylene, propylene, butene-1 and 4-methylpentene-1, namely, low-, medium- and high-density polyethylenes having a density of from 0.91 to 0.97 g/cm$^3$, and mutual copolymers of α-olefins such as the above α-olefins and hexene-1; polyamides; polyesters; polycarbonates; polyvinyl alcohol; polyvinylidene chloride; polyvinyl chloride; saponified ethylene-vinyl acetate copolymer; etc.

As the resin forming the thermoplastic layer (II), it is preferable for the manufacturing convenience to use a resin having a melting point lower by at least 5° C., preferably 10–50° C. or greater than the resin which makes up the thermoplastic resin layer (I).

When the thermoplastic resin layer (II) is used as an adhesive layer for example, it is preferable to use a low-density polyethylene, an ethylene-α-olefin copolymer having a density of from 0.86 to 0.94 g/cm$^3$, an ethylene-vinyl acetate copolymer, an ethylene(meth)acrylic acid copolymer, an ethylene(meth)acrylic ester copolymer, an ethylene-maleic acid or ester copolymer, a mixture thereof, an unsaturated carboxylic acid modified polymer thereof, or the like.

As a specific combination of the first and second thermoplastic resins, the resin forming the thermoplastic resin layer (II) may be a low-density polyethylene, an ethylene-α-olefin copolymer having a density of from about 0.86 to about 0.94 g/cm$^3$, an ethylene-vinyl acetate copolymer, an ethylene(meth)acrylic acid copolymer, an ethylene(methy)acrylic ester copolymer or the like when a polyolefin, for example, an α-olefin homopolymer such as a medium- or high-density polyethylene, polybutene-1 or poly-4-methylpentene-1 or a mutual copolymer of α-olefins such as the above-mentioned α-olefins and hexene-1 is used as the resin for forming the thermoplastic resin layer (I). Further, in combination with polypropylene, a polyamide, a polyester, a polycarbonate, polyvinyl alcohol, a saponified ethylene-vinyl acetate copolymer or the like, a polyolefin modified with an unsaturated carboxylic acid, an ethylene-vinyl acetate copolymer or the like can be used.

The term "light resistance imparting agent" as used herein means ultraviolet absorbers and light stabilizers of the benzotriazole, benzophenone derivative, substituted acrylonitrile, salicylic acid, nickel complex and hindered amine type.

Ultraviolet absorbers of the benzotriazole type include 2-(2'-hydroxy-5-methylphenyl)benzotriazole, 2-(2'-hydroxy-5,5'-t-butylphenyl)benzotriazole, alkylated hydroxybenzotriazoles, etc.

Ultraviolet absorbers of the benzophenone derivative type include 2-hydroxy-4-methoxybenzophenone, 2,4-dihydroxybenzophenone, 2-hydroxy-4-octoxybenzophenone, 4-dodecyloxy-2-hydroxybenzophenone, etc.

Ultraviolet absorbers of the acrylonitrile type include 2-ethylhexyl 2-cyano-3,3'-diphenylacrylate, ethyl 2-cyano-3,3'-diphenylacrylate, etc.

Ultraviolet absorbers of the salicylic acid type include phenyl salicylate, p-t-butylphenyl salicylate, p-octylphenyl salicylate, etc.

Ultraviolet absorbers of the nickel complex type include nickel bis(octylphenyl sulfide), [2,2'-thiobis(4-t-octyl phenolate)]-n-butyl amine nickel, etc.

Light stabilizers of the hindered amine type include [bis(2,2,6,6-tetramethyl-4-piperidyl) sebacate].

Of these light resistance imparting agents, light stabilizers of the hindered amine type are most preferred.

The amount of the light resistance imparting agent varies depending on the application field of the fibrillated web or nonwoven fabric, the environment, the purpose, etc. It is only necessary to incorporate the light resistance imparting agent in an effective amount. In general, it is preferred to add the light resistance imparting agent in a proportion of at least 300 ppm, preferably in a range of from 300 to 10,000 ppm based on the resin which makes up the thermoplastic resin layer (II). Amounts smaller than 300 ppm have a potential problem that light resistance may be exhibited only for a short period or may not be exhibited. Amounts greater than 10,000 ppm make it possible to exhibit light resistance over an extended period but result in a higher production cost. It is hence not desirable to use the light resistance imparting agent in any proportion outside the above range.

Other additives, for examples, light screening agents, ultraviolet screening agents, pigments, dyes and the like may also be used in combination in the present invention. Use of a light resistance imparting agent in combination with an antioxidant of the phenol, phosphorus or sulfur type can prevent the promotion of photo-deterioration of the surface layer by a light screening agent or pigment and also brings about synergistic effects with respect to weather-proofness. It is therefore desirable to use such a combined system.

The above-described antioxidants of the phenol type include hindered phenol compounds, specifically, 2,2'-methylenebis(4-methyl-6-t-butylphenol), 4,4'-butylidenebis(3-methyl-6-t-butylphenol), 4,4'-thiobis(3-methyl-6-t-butylphenol), tetrakis[methylene 3-(4'-hydroxy-3',5'-di-t-butylphenyl)propionate] methane, n-octadecyl 3-(4'-hydroxy-3',5'-di-t-butylphenyl) propionate, 2,4-bisoctylthio-6-(4'-hydroxy-3,5'-di-t-butylanilino)-1,3,5-triazine, 1,3,5-tris(4'-hydroxy-3',5'-di-t-butylbenzyl)-1,3,5-triazin-2,4,6(1H,3H,5H)-trione, 1,3,5-tris(3'-hydroxy-2',6'-dimethyl-4'-t-butylbenzyl)-1,3,5-triazin-2,4,6(1H,3H,5H)-trione, 1,3,5-trimethyl-2,4,6-tris(4'-hydroxy-3',5-di-t-butylbenzyl)benzene, etc.

As antioxidants of the phosphorus type, may be mentioned compounds such as phosphite esters, phosphite salts and phosphophenanthrene. Specific examples include dioctadecyl pentaerythrityl diphosphite, trioctadecyl phosphite, tris(nonylphenyl) phosphite, tris(2,4-di-t-butylphenyl) phosphite, 9,10-dihydro-9-oxa-10-phosphaphenanthrene-10-oxide, and tetrakis(2,4-di-t-butylphenyl) 4,4'-biphenylene diphosphonite.

As antioxidants of the sulfur type useful in the practice of this invention, may be mentioned thiols and sulfides. Specific examples include 3,3'-thiodipropionic acid, didodecyl 3,3'-thiopropionate, dioctadecyl 3,3'-thiopropionate, pentaerythrityl tetrakis(3-dodecylthiopropionate), and pentaerythrityl tetrakis(3-octadecylthiopropionate).

These antioxidants can be incorporated in a range of from about 300 to about 10,000 ppm based on the resin which forms the thermoplastic resin layer (II). If the amount is smaller than 300 ppm, their effects cannot be brought about fully so that there is a potential problem of resin deterioration, coloration and gelation. In addition, synergistic effects with the light resistance imparting agent cannot be expected. On the other hand, amounts in excess of 10,000 ppm do not bring about additional effects but result in an economical disadvantage and potential deterioration of mechanical properties. It is hence not preferred to incorporate the antioxidant in any proportion outside the above range.

As a typical example of light screening agents, aluminum powder or the like can be mentioned.

Although films added with aluminum powder reflect light and are effective for the protection and growth of crops and the like, aluminum powder is generally known to accelerate the photo-deterioration of resins.

The present invention can exhibit most remarkable effects when such a light screening agent is used in combination.

These antioxidants and ultraviolet absorbers can be used either singly or in combination. Especially, the combination of an antioxidant of the phenol type and an antioxidant of the phosphorus type is preferred because the effects of the present invention can be improved leapingly.

The nonwoven fabric according to the second aspect of this invention is a nonwoven fibrillated fabric having a network structure and using the above fibrillated web of the network structure as one of warp and weft members. It is a laminate with a base material such as filaments, an arrangement of filaments, spun-bonded filaments, a fleece, a uniaxially- or biaxially-stretched tape or a fibrillated film. Among these, preferred is said fabric having been obtained by laminating a fibrillated web and a uniaxially-stretched tape in a warp/weft relationship with the axes of orientation thereof crossing each other, or a nonwoven fibrillated fabric having a network structure and obtained by laminating plural fibrillated webs with the axes of orientation thereof crossing each other. However, depending on the application field, fibrillated webs may be laminated with the axes of orientation thereof being arranged at random or in a same direction.

As a method for bonding these nonwoven fabrics, it is possible to use a conventional adhesive such as a hot melt or an emulsion-type adhesive or to employ a fusion-bonding technique. In particular, when a multilayer composite film is formed by using a high-crystallinity thermoplastic resin as a base layer and a low-crystallinity thermoplastic resin as a surface layer, fusion-bonding can be effected without reducing effects which have been brought about by stretching the base layer of the highly-crystalline thermoplastic resin. This can bring about the advantage that nonwoven fabrics having high mechanical strength can be continuously produced, especially, by a simple process without need for the recovery of a solvent.

The process for producing the fibrillated web of the network structure will hereinafter be described in detail.

Among fibrillated webs according to this invention, a fibrillated web having a network structure and composed of a warp web can be produced by forming a film of at least two layers from a resin for the thermoplastic resin layer (I) and another resin for the thermoplastic resin layer (II), the latter resin having a lower melting point than the former resin and being added with at least a light resistance imparting agent, in accordance with an extrusion process such as the multilayer inflation technique or multilayer T-die technique and then rolling and/or stretching the film in the machine direction to have the film undergo first orientation at an extension ratio of 1.1–8 times, preferably 5–7 times and then second orientation at an extension ratio of 5–5 times, preferably 6–10 times, thereby splitting the film. Although the film has already been formed into a fibrillated web having a network structure, it may be expanded suitably to enlarge the openings of the network structure and then heat-set into a fibrillated web of an expanded network structure, if necessary.

On the other hand, a fibrillated web having a network structure and composed of a weft web can be produced by rolling the above multilayer composite film at a rolling ratio of 1.1–5 times, preferably 1.5–2.0 times in the transverse direction, forming a number of slits in parallel in the transverse direction and then stretching the resulting film at a ratio of 2–10 times, preferably 7–9 times. Likewise the weft web, the warp web may thereafter be expanded suitably in a perpendicular or oblique direction relative to the axis of orientation thereof and then set in the form of a network, if necessary.

N particular limitation is imposed on the method for splitting the warp web. This may be effected, for example, by using a fibrillating device as shown in Japanese Utility Model Publication No. 38979/1976 and bringing the device into contact with a running composite resin film while rotating it. In the case of the weft web on the other hand, slits may be formed preferably by bringing hot blades, which are embedded especially in the form of a zig-zag pattern, into contact with a composite resin film [U.S. Pat. No. 4,489,603 (Japanese Patent Publication No. 11757/1986)].

As has been described above, each of the fibrillated web of the network structure and the nonwoven fibrillated web of the network structure, according to the present invention, contains a light resistance imparting agent in at least the surface layer of the extruded two-layer composite film to retain weatherability and the high-crystallinity thermoplastic resin of the base layer is not added with such a light resistance imparting agent at all. The effects imparted by the stretching therefore remain at high levels. Furthermore, the mechanical properties and bonding can be retained over a long period of time. They are also economical.

Even when additives such as an ultraviolet absorber and a pigment are employed in combination, it is still possible to significantly prolong the service life of the fibrillated weatherproof web and nonwoven fibrillated weatherproof fabric by using them along with an antioxidant as needed.

In addition, the bonding can be achieved by fusion bonding so that compared to the conventional method of directly kneading such an additive into a resin or coating a resin film with such additives, much less adverse effects are given to the mechanical properties and solvent. An additive such as a light resistance imparting agent is added to the thermoplastic resin for the surface layer but is not added at all to the high-crystallinity thermoplastic resin for the base layer. It is therefore possible to avoid cutting upon stretching, any reduction to the effects brought about by stretching and undesirable propagation of slits.

Further, they can be produced continuously by the simple processes, respectively. The present invention has such numerous advantages.

Fibrillated web having a network structure or nonwoven fibrillated fabrics having a network structure according to this invention are suited for use outdoors in agriculture or horticulture, in construction or building, or as packaging materials such as flexible containers as they are or by bonding them with other materials.

EXAMPLES

The present invention will hereinafter be described by the following examples.

EXAMPLE 1

Resins used

High-crystallinity thermoplastic resin

High-density polyethylene [MFR=1.0 g/10 min; d=0.956 g/cm$^3$; "NISSEKI STAFLENH E710", trade mark; product of The Nisseki Plastic Chemical Co., Ltd.]

Low-crystallinity thermoplast resin

Low-density polyethylene
R=3.0 g/10 min; d=0.924 g/cm$^3$;
"NISSEKI REXLON F30", trade mark; product of The Nisseki Petrochemical Co., Ltd.]

PRODUCTION EXAMPLE

By the water-cooled multilayer inflation technique, the above-described high-density polyethylene (hereinafter abbreviated as "HDPE" was extruded as an inner layer while a low-density polyethylene (hereinafter abbreviated as "LDPE") added with 1,000 ppm of a light stabilizer of the hindered amine type ("Chimassorb 944LD", trade name; product of Ciba-Geigy AG) and 0.2 wt. % of calcium stearate as light resistance imparting agents and 0.09 wt. % of an antioxidant mixture (a 2:1 mixture by parts of "Irganox 1010", trade name and "Irgafos 168", trade name, both, products of Ciba-Geigy AG) was extruded on both sides of the inner layer, thereby forming a multilayer film composed of a three-layer composite structure having a thickness ratio of 15 μm LDPE/100 μm HDPE/15 μm LDPE and a width of 1.5 m. While causing the multilayer film to travel, the multilayer film was passed through a hot bath of from 90 to 95° C. and subjected to first stretching at a stretch ratio of 6 times, subjected to second stretching at a stretch ratio of 8 times in hot air of 100° C., and then brought into contact with a rotating fibrillating device as disclosed in Japanese Utility Model Publication No. 38979/1976 to split same, whereby a number of longitudinal slits were formed to provide a fibrillated web having slits in a zig-zag pattern (thickness ratio: 5 μm LDPE/35 μm HDPE/5 μm LDPE.

The fibrillated web was then expanded 2.5 times to obtain a expanded fibrillated web having a network structure. Portions of the expanded fibrillated web were then laminated in a warp/weft relationship and then fusion-bonded at a bonding temperature of 120° C., whereby a nonwoven fibrillated fabric having a network structure was formed. Its weatherability was thereafter tested. In the test, the bonding strength, tensile strength and elongation were measured. The results are shown in Table 1.

EXAMPLE 2

In a similar manner to Example 1 except that the proportion of the light resistance imparting agent was increased to 3,000 ppm, a nonwoven fibrillated weatherproof fabric having a network structure was produced and then evaluated. The results are shown in Table 1.

EXAMPLE 3

In a similar manner to Example 1 except that the proportion of the light resistance imparting agent was increased to 5,000 ppm, a nonwoven fibrillated weatherproof fabric having a network structure was produced and then evaluated. The results are shown in Table 1.

EXAMPLE 4

To the low-density polyethylene of Example 2, a master batch consisting of 40 wt %. of low-density polyethylene, 37.5 wt. % of aluminum powder (average particle size: 4-5 μm) and 22.5 wt. % of polyethylene wax as a dispersant was blended in an amount of 5 wt. %. A nonwoven fibrillated fabric having a network structure was formed and evaluated in a similar manner to Example 2. The results are given in Table 1.

EXAMPLE 5

To the low-density polyethylene of Example 3, a master batch consisting of 40 wt %. of low-density polyethylene, 37.5 wt. % of aluminum powder (average particle size: 4-5 μm) and 22.5 wt. % of polyethylene wax as a dispersant was blended in an amount of 5 wt. %. A nonwoven fibrillated fabric having a network structure was formed and evaluated in a similar manner to Example 3. The results are given in Table 1.

COMPARATIVE EXAMPLE 1

The low-density polyethylene of Example 1 was not added with any light resistance imparting agent but was added with 0.2 wt. % of calcium stearate and 0.09 wt. % of an antioxidant. A nonwoven fibrillated fabric having a network structure was formed and evaluated in a manner similar to Example 1. The results are shown in Table 1.

COMPARATIVE EXAMPLE 2

In a similar manner to Example 1 except that the proportion of the light resistance imparting agent was decreased to 200 ppm, a nonwoven fibrillated weatherproof fabric having a network structure was produced and then evaluated. The results are shown in Table 1.

COMPARATIVE EXAMPLE 3

To the low-density polyethylene of Comparative Example 1, a master batch consisting of 40 wt. % of low-density polyethylene, 37.5 wt. % of aluminum powder (average particle size: 4-5 μm) and 22.5 wt. % of polyethylene wax as a dispersant was blended in an amount of 5 wt. %. Evaluation was conducted in a similar manner to Example 1. The results are given in Table 1.

Incidentally, the following testing methods were used.

(1) Weatherability test (weather-o-meter) conditions:
JIS B 7753-1977 except that the spraying time was changed to 12 minutes per 60 minutes.

(2) Bonding strength (kg):
Using a "Tension" (trade mark; manufactured by Shimadzu Corp.), a J-shaped member connected to a load cell of the Tensilon was downwardly hooked on a central part of a test piece (200 mm long and 150 mm wide). A bottom part of the test piece was fixed on the Tensilon. At a pulling rate of 500 mm/min and a chart speed of 50 mm/min, the bonding strength was expressed by the average value of amplitudes of load values indicated when the network of the test piece was frayed.

(3) Tensile strength (kg/5 cm) and elongation (%):
Using a low-speed stretching tensile testing machine (Shopper model), the distance between an upper grip and a lower grip of the testing machine was set at 100 mm. Both ends of a test piece (200 mm long×50 mm wide) were secured to the grips, respectively. The test piece was pulled at a pulling rate of 200 mm/mil. When the test piece was cut off, the load and elongation at that time were recorded.

TABLE 1

| Example | Additive (ppm) | Physical property | Exposure time (hr) | | | | | |
|---|---|---|---|---|---|---|---|---|
| | | | 0 | 300 | 600 | 900 | 1200 | 1500 |
| Ex. 1 | Light resistance imparting agent (1000) | Bonding strength | 8.1 | 8.1 | 7.6 | 6.2 | — | — |
| | | Tensile strength | 22.1 | 22.6 | 20.3 | 16.8 | — | — |
| | | Elongation | 18.7 | 19.1 | 16.2 | 12.4 | — | — |
| Ex. 2 | Light resistance imparting agent (3000) | Bonding strength | 8.8 | 8.6 | 9.3 | 8.8 | — | — |
| | | Tensile strength | 24.1 | 23.9 | 23.5 | 20.0 | — | — |
| | | Elongation | 19.5 | 22.0 | 19.3 | 15.4 | — | — |
| Ex. 3 | Light resistance imparting agent (5000) | Bonding strength | 8.3 | 8.5 | 8.7 | 8.1 | — | — |
| | | Tensile Strength | 23.5 | 24.2 | 23.2 | 20.6 | — | — |
| | | Elongation | 18.3 | 20.8 | 19.0 | 15.0 | — | — |
| Ex. 4 | Light resistance imparting agent (3000), Al | Bonding strength | 8.0 | 7.6 | 7.3 | 7.4 | 7.5 | — |
| | | Tensile strength | 22.5 | 22.8 | 20.4 | 20.3 | 20.5 | 19.5 |
| | | Elongation | 17.3 | 19.8 | 15.8 | 16.89 | 16.5 | 13.8 |
| Ex. 5 | Light resistance imparting agent (5000), Al | Bonding strength | 7.9 | 8.2 | 7.9 | 7.5 | 7.4 | — |
| | | Tensile strength | 23.6 | 23.0 | 22.8 | 19.7 | 18.5 | 17.7 |
| | | Elongation | 18.8 | 18.3 | 17.3 | 16.8 | 14.8 | 13.0 |
| Comp. Ex. 1 | Light resistance imparting agent (0) | Bonding strength | 8.2 | 8.3 | 6.5 | 4.5 | — | 2.3 |
| | | Tensile strength | 21.3 | 18.8 | 17.2 | 11.6 | — | 11.0 |
| | | Elongation | 18.5 | 18.8 | 13.3 | 7.9 | — | 6.9 |
| Comp. Ex. 2 | Light resistance imparting agent (200) | Bonding strength | 8.4 | 8.5 | 7.4 | 5.0 | — | — |
| | | Tensile strength | 22.1 | 23.1 | 19.1 | 13.0 | — | — |
| | | Elongation | 19.2 | 18.3 | 15.4 | 10.0 | — | — |
| Comp. Ex. 3 | Light resistance imparting agent (0), Al | Bonding strength | 7.2 | 4.7 | 2.1 | 1.6 | 1.4 | 1.4 |
| | | Tensile strength | 27.0 | 21.4 | 15.3 | 14.4 | 11.1 | 9.0 |
| | | Elongation | 23.0 | 17.8 | 11.8 | 10.5 | 6.5 | 4.8 |

We claim:

1. A fibrillated weatherproof network web comprising a multilayer composite film formed of at least two layers, one being a first layer (I) extruded from a first thermoplastic resin and the other being a second layer (II) extruded from a second thermoplastic resin having a melting point lower than the first thermoplastic resin and containing at least 300 ppm of a light resistance imparting agent, said film defining a number of slits formed in a lengthwise or transverse direction thereof and having been oriented at an extension ratio in a range of from 1.1. to 15 times, or having been oriented at an extension ratio in a range of from 1.1 to 15 times and expanded in a direction perpendicular to oblique relative to the axis of orientation and then heat-set.

2. The web of claim 1, wherein said multilayer composite film comprises a three layer composite film formed for the first layer (I) and the second layer (II) and a third layer (III) extruded from said second thermoplastic resin, said second and third layers are laminated on both sides of said thermoplastic resin layer (I), respectively, and said third layer may contain or not contain said light resistance imparting agent.

3. The web of claim 1, wherein said web is an uniaxially oriented fibrillated network web comprising a warp web formed by stretching said multilayer composite film in a machine direction or a weft web formed by stretching said multilayer composite film in a transverse direction; or is a biaxially-oriented fibrillated network web formed by stretching said multilayer composite film in both machine and transverse directions.

4. The web of claim 1, wherein when said second layer (II) is used as a adhesive layer, the thickness of said second layer (II) is 50% or less of the total thickness of said first and second layers.

5. The web of claim 1, wherein the thickness of the second layer (II) is in a range of from 10 to 100 $\mu$m in an unstretched state.

6. The web of claim 1, wherein said first thermoplastic resin forming said first layer (I) is selected from the group consisting of homopolymers of $\alpha$-olefins such as ethylene, propylene, butene-1 and 4-methylpentene-1, mutual copolymers of said $\alpha$-olefins, polyamides, polyesters, polycarbonates, polyvinyl alcohol, polyvinylidene chloride, polyvinyl chloride and saponified ethylene-vinyl acetate copolymer.

7. The web of claim 1, wherein when said second layer (II) is used as a adhesive layer, said second thermoplastic resin forming said second layer(II) is selected from the group consisting of low density polyethylene, ethylene-$\alpha$-olefin copolymers having a density of from 0.86 to 0.94 g/cm$^3$, ethylene-vinyl acetate copolymers, ethylene-(metha)acrylic acid copolymers, ethylene-(meth)acrylic ester copolymer, ethylene-maleic acid and -maleic ester copolymers, mixtures thereof and unsaturated carboxylic acid modified polymers thereof.

8. The web of claim 1, wherein the difference in melting point between said first thermoplastic resin forming said first layer (I) and said second thermoplastic resin forming said second layer (II) is at least 5° C.

9. The web of claim 1, wherein said light resistance imparting agent is an ultraviolet absorbent or light stabilizer of the benzotriazole, benzophenone derivative, substituted-acrylonitrile, salicyclic acid, nickel complex or hindered amine type.

10. The web of claim 1, wherein the amount of light resistance imparting agent is in a range of 300–10,000 ppm based on said second thermoplastic resin forming said second layer (II).

11. The web of claim 1, wherein said web is an expanded web formed by expanding said oriented multilayer composite film in a direction of perpendicular or oblique to said direction of orientation and then heat-setting the thus -expanded film.

12. A nonwoven fibrillated weatherproof network fabric comprising, as at least one warp and weft members thereof, a fibrillated weatherproof network web comprising a multilayer composite film formed of at least two layers, one being a first layer (I) extruded from a first thermoplastic resin and the other being a second layer (II) extruded from a second thermoplastic resin having a melting point lower than the first thermoplastic resin and containing at least 300 ppm of a light resistance imparting agent, said film defining a number of slits formed in a lengthwise or transverse direction thereof and having been oriented at an extension ratio in a range of from 1.1 to 15 times or having been oriented at an extension ratio in a range of from 1.1 to 15 times and expanded in a direction perpendicular or oblique relative to the axis of orientation and then heat-set.

13. The nonwoven fabric of claim 12, further comprising a rolled or stretched tape laminated with said fibrillated weatherproof network web in a warp/weft or weft/warp relationship with axis of orientation thereof crossing each other.

14. The nonwoven fabric of claim 12, further comprising at least one fibrillated weatherproof network web of the same type as the above-mentioned fibrillated weatherproof network web, all the said fibrillated weatherproof network webs being laminated with axis of orientation thereof crossing each other.

15. A process for the production of a fibrillated weatherproof network web, which comprises forming a multilayer composite film composed of at least two layers, one being a first layer (I) extruded from a first thermoplastic resin and the other being a second layer (II) extruded from a second thermoplastic resin having a melting point lower than said first resin and containing an effective amount of light resistance imparting agent; and subjecting said multilayer composite film to first orientation at an extension ratio in a range of from 1.1 to 8 times in a machine direction by rolling and/or stretching and then to second orientation at an extension ratio of from 5 to 15 times in the machine direction to form slits or to split said composite film; or first orientating at an extension ratio in a range of from 1.1 to 8 times in a machine direction by rolling and/or stretching and then second orienting at an extension ratio of from 5 to 15 times in the machine direction to form slits or to split said composite film and third expanding the thus-obtained film in a direction perpendicular or oblique to the length thereof and then heat-setting the film thus expanded.

16. A process for the production of a fibrillated weatherproof network web, which comprises forming a multilayer composite film composed of at least two layers, one being a first layer (I) extruded from a first thermoplastic resin and the other being a second layer (II) extruded from a second thermoplastic resin having a melting point lower than said first resin and containing an effective amount of light resistance imparting agent; rolling the composite film at a rolling ratio in a range of from 1.1 to 5 times in a transverse direction of the film; forming a number of slits in parallel in said transverse direction; and stretching the resultant film at a draw ratio in a range of from 2 to 10 times in said transverse direction; or stretching the resultant film at a draw ratio in a range of from 2 to 10 times in said transverse direction and expanding the thus-obtained film in a direction perpendicular or oblique to the length thereof and then heat-setting the film thus expanded.

17. A process for the production of a nonwoven fabric, which comprises:
(i) overlaying in a warp/weft relationship (A) a warp web obtained by forming a multilayer composite film composed of at least two layers, one being a first layer (I) extruded from a first thermoplastic resin and the other being a second layer (II) extruded from a second thermoplastic resin having a melting point lower than said first resin and containing an effective amount of light resistance imparting agent, and subjecting said multilayer composite film to first orientation at an extension ratio in a range of from 1.1 to 8 times in a machine direction by rolling and/or stretching and then to second orientation at an extension ratio of from 5 to 15 times in the machine direction to form slits or to split said composite film, or first orientating at an extension ratio in a range of from 1.1 to 8 times in a machine direction by rolling and/or stretching and then secondly orienting at an extension ratio of from 5 to 15 times in the machine direction to form slits or to split said composite film and then thirdly expanding the thus-obtained film in a direction perpendicular or oblique to the length thereof and then heat-setting the film thus expanded, and (B) a weft web obtained by forming a multilayer composite film composed of at least two layers, one being a first layer (I) extruded from a first thermoplastic resin and the other being a second layer (II) extruded from a second thermoplastic resin having a melting point lower than said first resin and containing an effective amount of light resistance imparting agent, rolling the composite film at a rolling ratio in a range of from 1.1 to 5 times in a transverse direction of the film, forming a number of slits in parallel in said transverse direction, and stretching the resultant film at a draw ratio in a range of from 2 to 10 times in said transverse direction, or stretching the resultant film at a draw ratio in a range of from 2 to 10 times in said transverse direction and expanding the thus-obtained film in a direction perpendicular or oblique to the length thereof and then heat-setting the film thus expanded; and
(II) thermocompression bonding the thus-overlayed warp and weft webs at a temperature not higher than the melting point of the first thermoplastic resin but at least equal to the melting point of the second thermoplastic resin.

* * * * *